United States Patent [19]
Johnson et al.

[11] Patent Number: 5,940,212
[45] Date of Patent: Aug. 17, 1999

[54] CUBE CORNER ARTICLE WITH ALTERED INACTIVE AREAS AND METHOD OF MAKING SAME

[75] Inventors: Norbert L. Johnson, Minneapolis; Theodore J. Szczech, Woodbury; Bruce D. Orensteen, St. Paul, all of Minn.

[73] Assignee: 3M Innovative Properties Company, St. Paul, Minn.

[21] Appl. No.: 08/960,841

[22] Filed: Oct. 30, 1997

[51] Int. Cl.⁶ .............................. G02B 5/122; G02B 5/124
[52] U.S. Cl. ......................... 359/529; 359/530; 359/900
[58] Field of Search ................................... 359/529, 530, 359/833, 834, 900

[56] References Cited

U.S. PATENT DOCUMENTS

| | | |
|---|---|---|
| 1,591,572 | 7/1926 | Stimson . |
| 3,190,178 | 6/1965 | McKenzie . |
| 4,025,159 | 5/1977 | McGrath . |
| 4,082,426 | 4/1978 | Brown . |
| 4,208,090 | 6/1980 | Heenan . |
| 4,588,258 | 5/1986 | Hoopman . |
| 4,634,220 | 1/1987 | Hockert et al. . |
| 4,650,283 | 3/1987 | Orensteen et al. . |
| 4,691,993 | 9/1987 | Porter et al. . |
| 4,708,920 | 11/1987 | Orensteen et al. ........................ 430/11 |
| 4,775,219 | 10/1988 | Appeldorn et al. . |
| 4,778,769 | 10/1988 | Forrest et al. ........................... 436/501 |
| 4,801,193 | 1/1989 | Martin . |
| 5,066,098 | 11/1991 | Kult et al. ................................ 359/540 |
| 5,138,488 | 8/1992 | Szczech ................................... 359/529 |
| 5,272,562 | 12/1993 | Coderre ................................... 359/529 |
| 5,450,235 | 9/1995 | Smith et al. ............................ 359/529 |
| 5,557,836 | 9/1996 | Smith et al. ............................ 29/527.4 |
| 5,565,151 | 10/1996 | Nilsen . |
| 5,592,330 | 1/1997 | Bernard ................................... 359/529 |
| 5,657,162 | 8/1997 | Nilsen et al. . |

FOREIGN PATENT DOCUMENTS

| | | | |
|---|---|---|---|
| 2 254 826 | 10/1992 | United Kingdom ........... | G02B 5/122 |
| WO 96/03285 | 2/1996 | WIPO . | |
| WO 96/30786 | 10/1996 | WIPO ............................ | G02B 5/124 |

OTHER PUBLICATIONS

Baker, Peter M., "Laser Marking of Component Parts in the Factory," *Tooling & Production Magazine*, (Nov. 1980).
Sample: Retroreflective sheeting designated "Sample A" believed to be on sale before Oct. 30, 1996.
Sample: Retroreflective sheeting designated "Sample B" believed to be on sale before Oct. 30, 1996, and accompanying product literature.

*Primary Examiner*—James Phan
*Attorney, Agent, or Firm*—Stephen C. Jensen

[57] ABSTRACT

A reflective article has a structured surface which includes geometric structures each having at least three specularly reflecting faces which converge at an apex or other extremity. The article is marked with a plurality of spots located between the extremities, the spots having different reflectivity characteristics than the specularly reflecting faces. The geometric structures can comprise cube corner elements. The spots can be diffusely reflecting and distributed uniformly on the structured surface or distributed to define a particular pattern. The article can have a plurality of first active areas at a first illumination geometry, and the spots can be sized and positioned such that they avoid the first active areas. The article can have first inactive areas adjacent the first active areas, and each spot can cover a majority of one inactive area. Alternatively, at least some of the spots can be decentered within their respective inactive areas such that they are visible in retroreflected light only at selected illumination geometries, thereby forming a directional image.

32 Claims, 8 Drawing Sheets

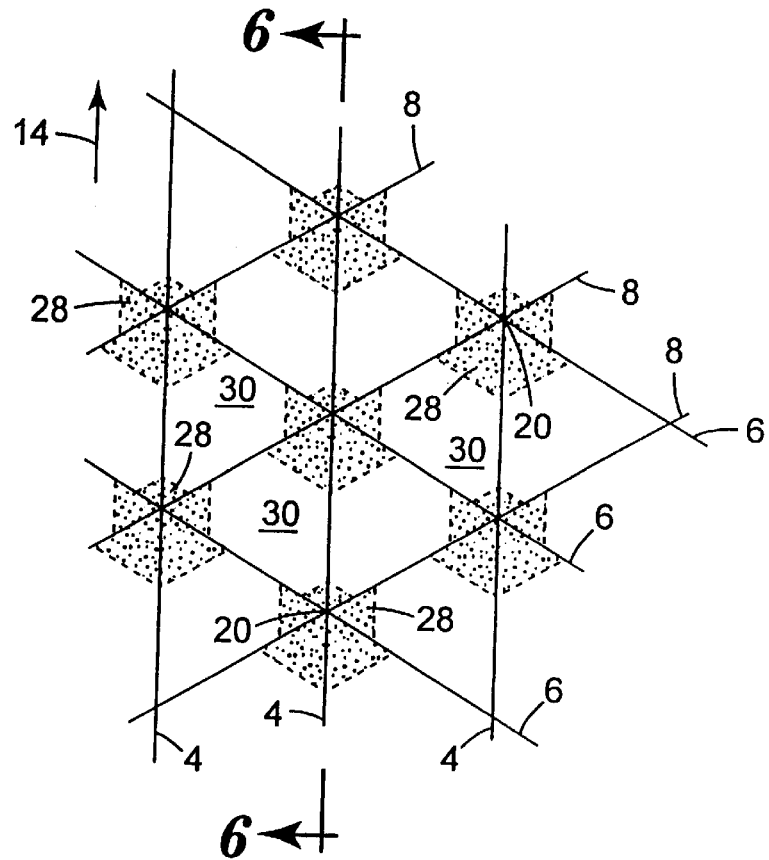
Fig. 5
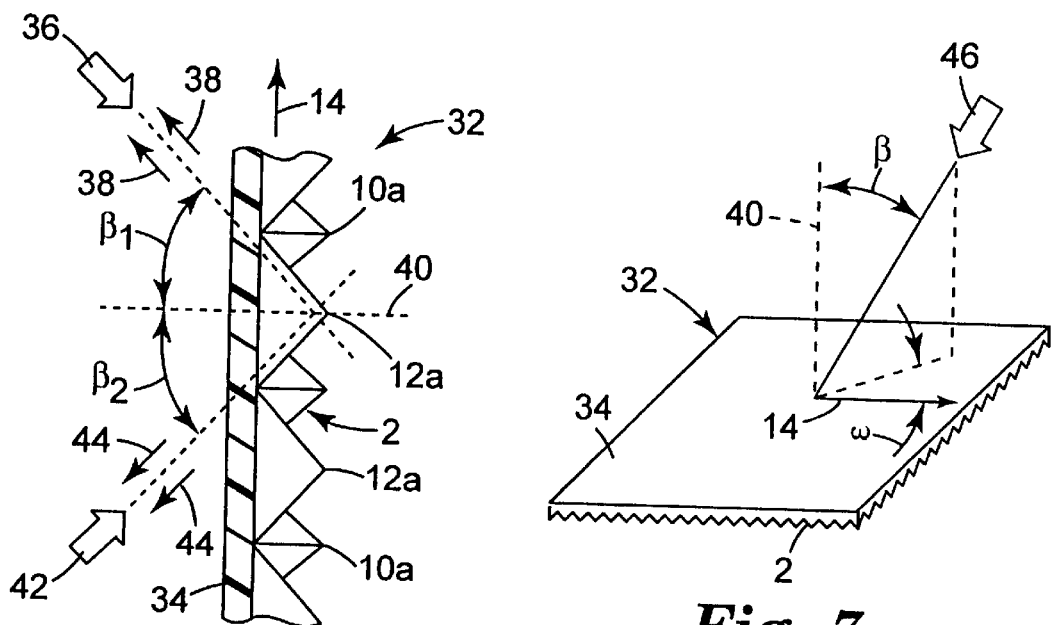
Fig. 6
Fig. 7

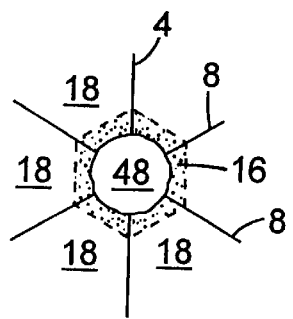
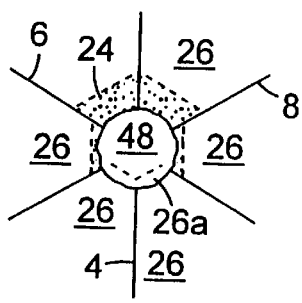
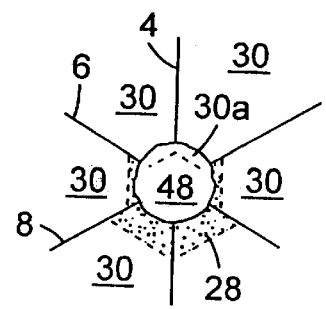
Fig. 8A  Fig. 8B  Fig. 8C
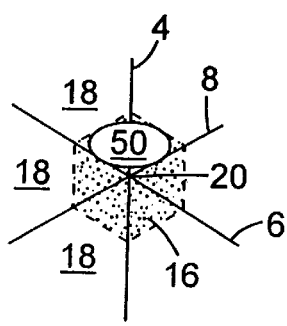
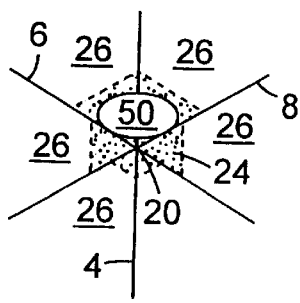
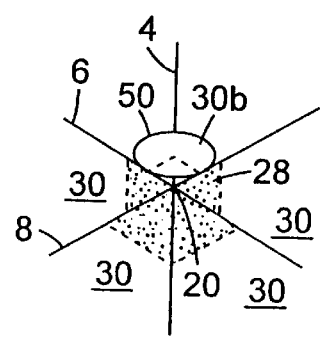
Fig. 9A  Fig. 9B  Fig. 9C
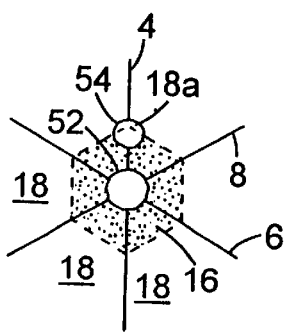
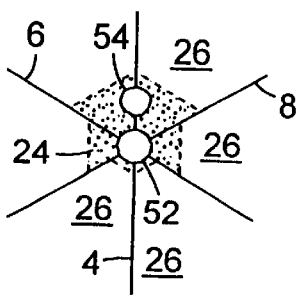
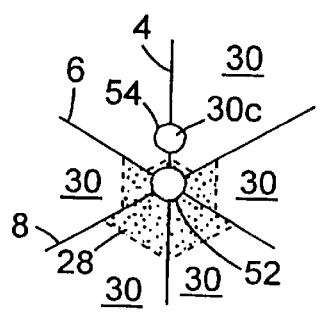
Fig. 10A  Fig. 10B  Fig. 10C

CUBE CORNER ARTICLE WITH ALTERED INACTIVE AREAS AND METHOD OF MAKING SAME

BACKGROUND

The present invention relates generally to reflective articles. The invention has particular application to retroreflective sheeting fabricated using microreplication techniques.

"Retroreflective" as used herein refers to the attribute of reflecting a light ray in a direction antiparallel to its incident direction, or nearly so, such that it returns to the light source or the immediate vicinity thereof Two known types of retroreflective sheeting are microsphere-based sheeting and cube corner sheeting. Microsphere-based sheeting, sometimes referred to as "beaded" sheeting, employs a multitude of microspheres typically at least partially imbedded in a binder layer and having associated specular or diffuse reflecting materials (e.g., pigment particles, metal flakes, vapor coats) to retroreflect incident light. Illustrative examples are disclosed in U.S. Pat. Nos. 3,190,178 (McKenzie), 4,025,159 (McGrath), and 5,066,098 (Kult). Due to the symmetrical geometry of beaded retroreflectors, microsphere-based sheeting exhibits a relatively orientationally uniform light return with respect to rotations about an axis normal to the surface of the sheeting. In general, however, such sheeting has a lower retroreflective efficiency than cube corner sheeting.

U.S. Pat. No. 4,708,920 (Orensteen et al.) discloses a modified beaded sheeting wherein a set of axial markings are formed in the sheeting by laser irradiation at a specific angle, each marking being located at the rear of a microlens. The sheeting thus bears a directional half-tone image composed of the axial markings and viewable, in only a selected cone of observation, in retroreflected light. Directional images such as this are widely used as anticounterfeiting measures for motor vehicle license plates.

Cube corner retroreflective sheeting comprises a body portion typically having a substantially planar front surface and a structured rear surface comprising a plurality of cube corner elements. Each cube corner element comprises three approximately mutually perpendicular optical faces that intersect at a cube apex or, where the cube apex is truncated, that otherwise converge at an uppermost portion. Examples of various cube corner designs include those of U.S. Pat. Nos. 1,591,572 (Stimson), 4,588,258 (Hoopman), 4,775,219 (Appledorn et al.), 5,138,488 (Szczech), 5,450,235 (Smith et al.), and 5,557,836 (Smith et al.). It is known to treat the structured surface with a specularly reflective coating to improve performance at high entrance angles. It is also known to apply a seal layer to the structured surface in a regular pattern of closed polygons which form isolated, sealed cells to keep contaminants away from individual cube corners. Heat and pressure used to form the cells destroys or deforms cube corner elements located along the polygon boundaries.

Cube corner sheeting typically has a much higher retroreflectance than beaded sheeting, where retroreflectance is expressed in units of candelas per lux per square meter. Cube corner sheeting therefore typically appears brighter than beaded sheeting in retroreflected light. However, certain graphics applications require not only high retroreflectance but high daytime "whiteness". The whiteness of an object is sometimes described in terms of the second of the tristimulus coordinates (X,Y,Z) for the object, and thus is referred to as "cap-Y". The cap-Y scale ranges from 0 for a perfectly black object to 100 for a perfectly white object. The whiteness of an object is also sometimes described in terms of its "Luminance Factor", ranging from 0 to 1. If the daytime whiteness of cube corner sheeting could be increased, without substantially reducing retroreflectance, such sheeting could find much broader application in graphics applications. Cube corner sheetings which have an aluminum or other metal vapor coat applied to the structured surface tend to have a somewhat grayish appearance, and could particularly benefit from an increase in whiteness.

It would also be desirable to incorporate directional images, such as are currently produced in beaded sheeting, in cube corner sheeting, even though conventional cube corner sheeting does not incorporate any lens- or microlens-type structure.

Cube corner sheeting is typically composed of a polymeric material formed using a precision negative mold having a mold structured surface which is the inverse or complement of the desired structured surface of the sheeting. There are two ways of obtaining the precision negative mold. The standard way begins with fabricating a "master mold" by a very expensive and time-consuming process involving precisely machining microscopic angled surfaces in a substrate such as a directly machinable substrate, individual pins, or one or more lamina. See, e.g., U.S. Pat. No. 4,478,769 (Pricone et al.). A second way, which is possible only if a sample is available having the desired structured surface in an undisturbed condition, is to use such a sample itself as a "master" from which replicas are made, thereby bypassing the expensive procedure of fabricating the master mold.

It would be desirable to mark cube corner sheeting in some way, preferably without substantially reducing retroreflective performance, in order to deter unscrupulous copyists from duplicating the structured surface of the sheeting without investing in the tooling and machining required to produce a master mold.

BRIEF SUMMARY

Disclosed herein is a reflective article having a structured surface which includes at least one geometric structure each having at least three specularly reflecting faces which converge at an extremity of the respective geometric structure. The article also has a plurality of spots spaced apart from each extremity, the spots having different reflectance characteristics than the specularly reflecting faces. In one embodiment the specularly reflecting faces comprise a cube corner element. The spots, which are preferably diffusely reflecting to enhance whiteness of the article, can be distributed uniformly on the structured surface or distributed to define a particular pattern.

In one embodiment the article has a plurality of first active areas at a first illumination geometry, and the spots include a first group of spots sized and positioned such that they avoid the first active areas. The article can have first inactive areas adjacent the first active areas, and each spot in the first group can cover a majority of one inactive area. Alternatively, at least some of the spots can be decentered within their respective first inactive areas such that they are visible in retroreflected light only at selected illumination geometries.

A method is disclosed for making a marked cube corner article. The method includes providing an article having a structured surface which has a plurality of first active areas and first inactive areas associated with a first illumination geometry. The method also includes marking the structured surface in localized regions positioned to overlap the first inactive areas more than the first active areas. The marking step can include selectively altering the structured surface at spots confined to one or more first inactive areas. The article can comprise a mold, so that once the mold has been marked as desired, a multitude of marked cube corner articles such as cube corner sheeting can be formed from the marked mold using known microreplication techniques. Alternately, the article can comprise cube corner sheeting.

BRIEF DESCRIPTION OF THE DRAWINGS

FIG. 5 is a plan view similar to FIG. 2 but showing the location of third active and inactive areas corresponding to a third illumination geometry.

FIG. 6 is a sectional view taken along line 6—6 in FIGS. 1, 4, and 5.

FIG. 7 is a perspective view of a reflective article showing angles associated with an illumination geometry.

FIGS. 8A–C are plan views showing the relative position of a diffusely reflecting spot relative to an inactive area for various illumination conditions.

FIGS. 9A–C and 10A–C are analogous to FIGS. 8A–C respectively but for different spot configurations.

Figure 1:
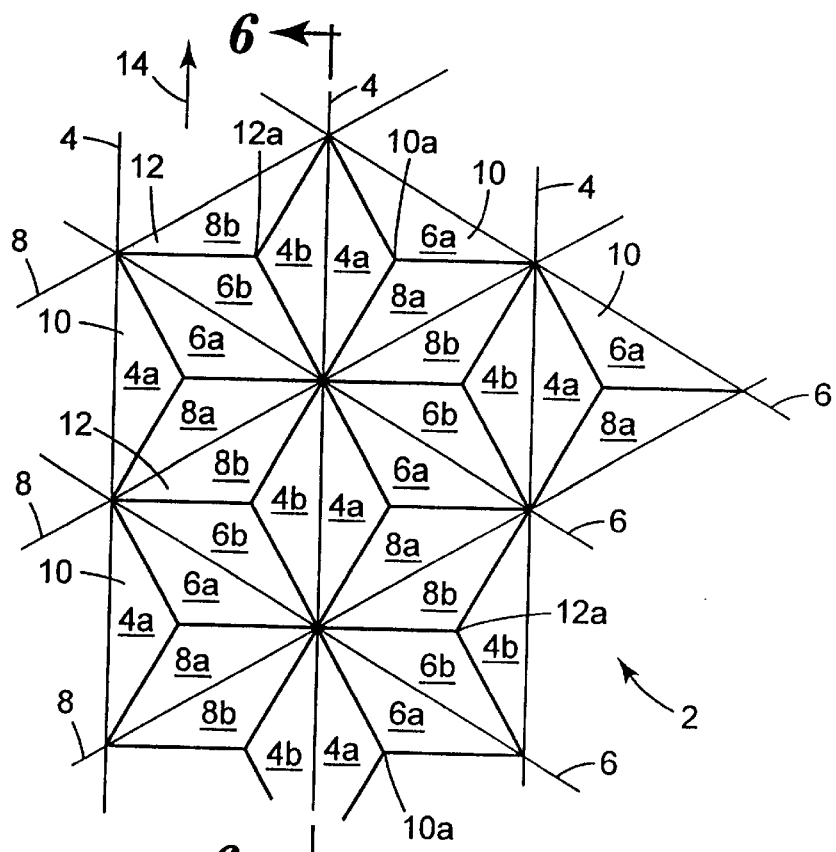
FIG. 1 is a magnified front plan view of a retroreflective article having a structured surface.

In the drawings, the same reference symbol is used for convenience to indicate elements which are the same or which perform the same or a similar function.

DETAILED DESCRIPTION OF THE ILLUSTRATIVE EMBODIMENTS

FIG. 1 shows a magnified plan view of a structured rear surface 2 of a retroreflective sheeting layer as seen through a front surface thereof Three sets of parallel grooves 4,6,8 are formed in the structured surface 2, defining geometric structures 10 and 12 which each have three faces that converge at an apex 10a, 12a respectively. Apexes 10a, 12a are the rearmost extremities of structures 10, 12, and the "bottom" or "vertex" of grooves 4,6,8 (the frontmost portion, where opposed groove side surfaces intersect) define triangular-shaped bases of structures 10, 12. The faces of structure 10 comprise groove side surfaces 4a,6a,8a, and the faces of structure 12 comprise groove side surfaces 4b,6b,8b. For ease of illustration, only some of the side surfaces of grooves 4,6,8 are shown in FIG. 1.

The groove sets intersect each other at about 60 degree included angles. The geometric structures 10, 12 as shown are cube corner elements, meaning that three side surfaces of each structure are approximately mutually perpendicular. The faces of the cube corner elements are substantially smooth and are characterized by high specular reflectivity and small or negligible diffuse reflectivity. If desired, some or all of the apexes 10a, 12a can be truncated to allow the structured surface to be partially transmissive. In such case the faces of the geometric structures would still converge at extremities of such structures, the extremities then being the truncated peaks.

An imaginary datum mark 14 is also shown in FIG. 1 as a reference from which angles can be defined to describe various illumination geometries. Mark 14 is shown parallel to groove set 4.

Figure 2:
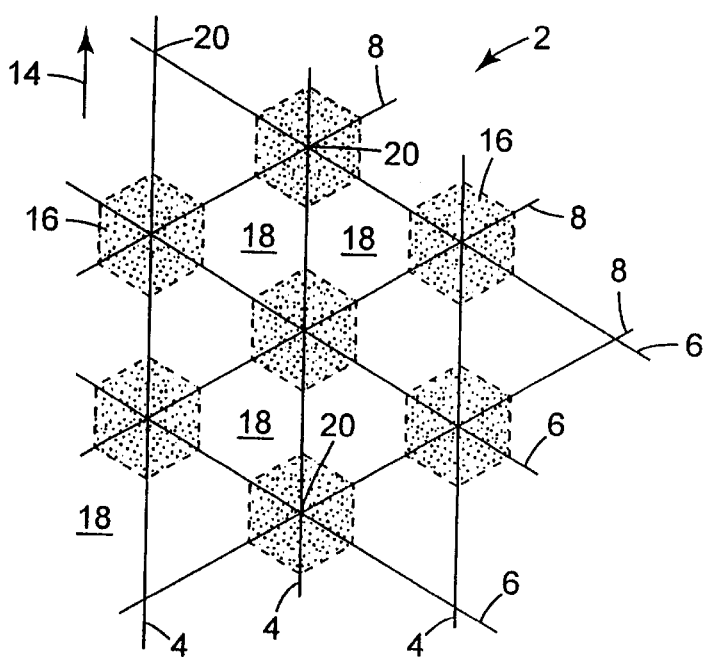
FIG. 2 is a plan view similar to FIG. 1 but showing the location of active and inactive areas on the structured surface for a first illumination geometry.

FIG. 2 is a depiction of the same view of the structured surface 2 of FIG. 1, but where the groove side surfaces are not shown. This is so that "inactive areas" 16, which are shaded, and "active areas" 18, which are unshaded, can more easily be viewed. It will be understood that inactive areas 16 are located at each point of intersection 20 of the three groove sets 4,6,8, whether or not shown as such in FIG. 2.

The term "inactive area" can be defined as follows: a light ray striking the structured surface in an "inactive area" does not go on to strike both of the other two reflecting faces of the geometric structure. For a cube corner element, this condition is generally exhibited by a dark appearance in retroreflected light. An "active area" is defined in an opposite manner: a light ray striking the structured surface in an "active area" does go on to strike both of the other two reflecting faces. Active areas generally appear bright in retroreflected light.

Since the active and inactive areas are defined in terms of the incident light, these areas can and do change as a function of the "illumination geometry", i.e., the direction of the incident light with respect to the sheeting or article. The incident light direction is typically described in terms of entrance angle β and orientation angle ω (see glossary and FIG. 7, both infra). FIG. 2 depicts the situation for light incident perpendicular to the sheeting, i.e. for β=0. For 60-60-60 degree (non-canted) cube corner elements, and for normally incident light, the inactive areas comprise approximately ⅓ of the total area of the structured surface.

Figure 3:
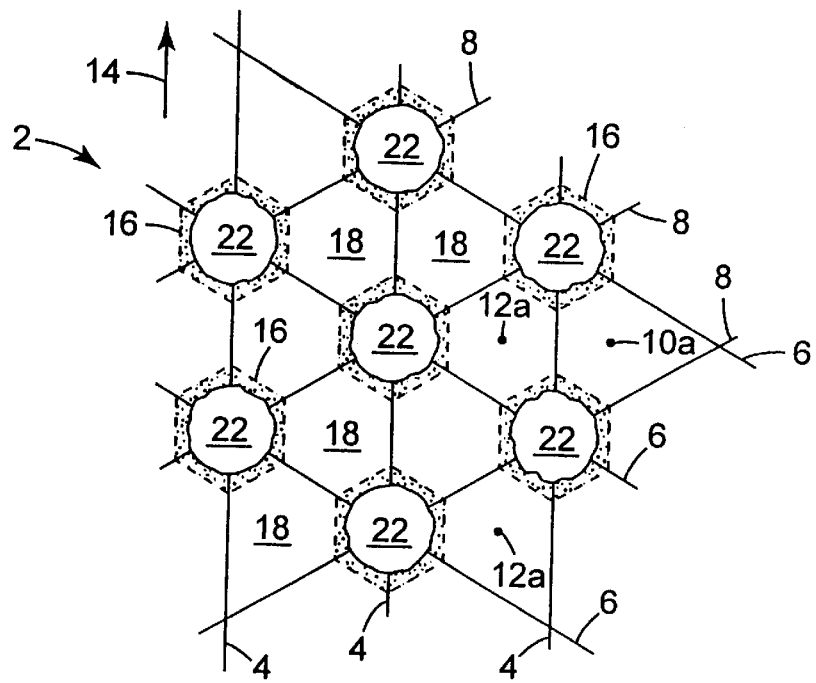
FIG. 3 is a plan view similar to FIG. 2 and also including a plurality of diffusely reflective spots.

In FIG. 3, structured surface 2 has been altered to include diffusely reflecting spots 22 which are dispersed among the geometric structures and located within inactive areas 16. The spots 22 have a roughened texture or quality which scatters a light ray incident on them into many different directions. This is in contrast with surfaces of structured surface 2 that are adjacent spots 22, such as the unaltered portions of faces 4a,4b,6a,6b,8a,8b. Such faces are highly specularly reflective to minimize losses for light rays that reflect off of three of the faces, thereby maintaining high retroreflective performance. Spots 22 can comprise spots of paint, patterned photoresist, or other suitable diffuse material applied to the structured surface 2, depending upon the size of the geometric structures. Such materials will frustrate total internal reflection (TIR) from the affected areas to produce the desired diffuse quality without actually disturbing the smooth surface finish of the affected area. Spots 22 can also comprise localized regions where the surface finish of structured surface 2 is roughened relative to adjacent regions. A method of producing such physically roughened regions using concentrated laser energy is described below.

The spots 22 of FIG. 3 enhance the whiteness of retroreflective sheeting to which they are applied, since they reflect incident light in all directions. Advantageously, the spots 22 do not degrade retroreflective performance to the extent they are confined to inactive areas. Larger spots which completely cover the inactive areas 16 and which cover a small portion of active areas 18 can also be used where retroreflectance can be sacrificed for greater increases in whiteness. Maximum whiteness at maximum retroreflectance is achieved when the spots fill the inactive areas without impinging on the active areas.

It is apparent from a comparison of FIGS. 1, 2, and 3 that the spots 22 occupy positions which do not overlap with apexes 10a, 12a. Spots 22 are located between apexes 10a, 12a.

Figure 4:
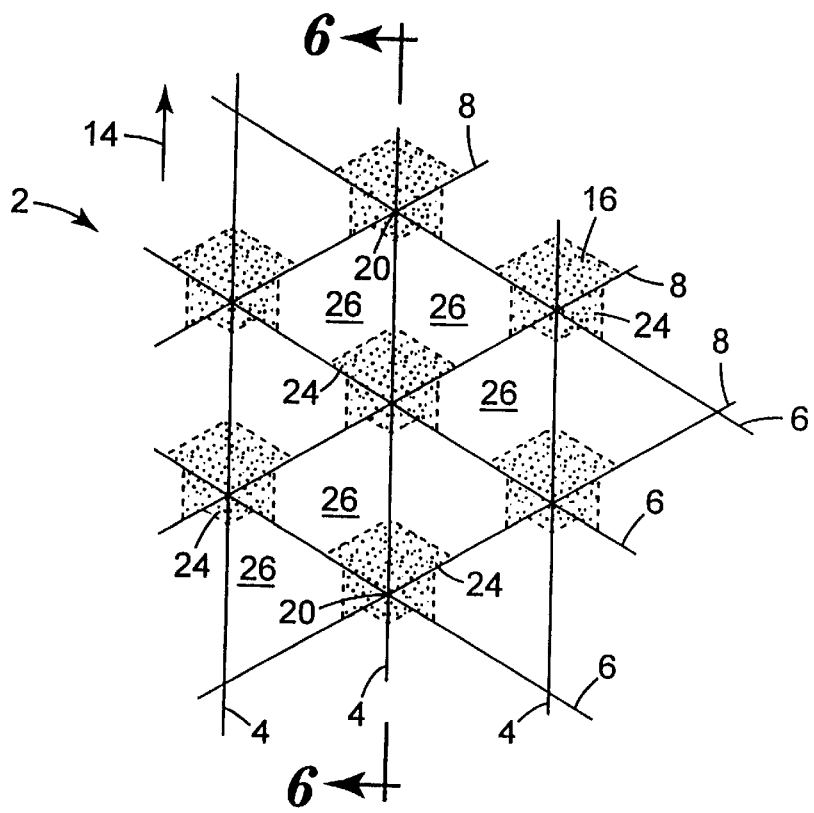
FIG. 4 is a plan view similar to FIG. 2 but showing the location of second active and inactive areas corresponding to a second illumination geometry.

FIG. 4 shows the same plan view of structured surface 2 shown in FIG. 2 but now with collimated light incident at $\beta \approx 30$ degrees, $\omega \approx 0$ degrees. This illumination gives rise to inactive areas 24 (shown shaded) and active areas 26 (shown unshaded) different from areas 16,18 respectively.

FIG. 5 is similar to FIG. 4 except that light is incident at $\beta \approx 30$ degrees, $\omega \approx 80$ degrees. This illumination produces inactive areas 28 (shown shaded) and active areas 30 (shown unshaded) different from those of FIGS. 2 and 4.

FIG. 6 is a sectional view through a reflective sheeting or article 32 having the structured surface 2 opposite a front surface 34. The views of FIGS. 1–5 are of article 32 as seen from the left side of FIG. 6. Arrow 36 represents the direction of incident light associated with FIG. 4, with arrows 38 representing light retroreflected from active areas 26. Arrow 36 makes an angle $\beta_1 \approx 30$ degrees with respect to an axis 40 which is normal to front surface 34. Arrow 42, also making an angle $\beta_2 \approx 30$ degrees with respect to axis 40, represents the incident light direction associated with FIG. 5. Arrows 44 represent retroreflected light from active areas 30. The angles $\beta_1$, $\beta_2$ are not drawn to scale in FIG. 6.

FIG. 7 shows a perspective view of sheeting 32 being illuminated with light from a direction 46 characterized by an entrance angle $\beta$ and orientation angle $\omega$.

Turning now to FIGS. 8A–C, one of the intersection points 20 is shown for the three illumination geometries $\{\beta,\omega\}$ of $\{0,0\}$, $\{30,0\}$, and $\{30,180\}$ degrees respectively. A diffusely reflecting spot 48 covers most (more than half the surface area) of the inactive zone 16, which comprises inactive portions of three neighboring structures 10 and three neighboring structures 12. A broken line is shown to define the border of the aggregate inactive area in FIG. 8A and in the other figures. The spot 48 can but does not necessarily obliterate edges between angled faces on the structured surface such as the edges between faces 4a,4b, 8b,8a,6a,6b (see FIG. 1). FIGS. 8B and 8C show that for off-axis illumination directions 36 and 42, respectively, active areas 26 and 30 encroach upon spot 48. Of course, the portions 26a,30a of areas 26,30 which overlap spot 48 become at least partially inactive since a light ray striking those locations will be diffusely reflected in many different directions and hence will not be efficiently retroreflected. Due to the overlap portions 26a,30a, the retroreflected light for illumination directions 36,42 is slightly darkened. Spot 48, therefore, in addition to enhancing the whiteness of the retroreflector, also can be used to provide a directional pattern or image since it degrades retroreflectance at some illumination angles and not at others. A plurality of spots 48 placed at selected intersection points 20 act as individual pixels to make up the desired pattern or (half-tone) image.

The amount of darkening or reduction of retroreflected light at a given illumination geometry is a function of (1) the extent to which specular reflection in the altered areas has been reduced, and (2) the fractional active area which becomes inactive due to the presence of the spots. The second factor can be greater than the percent of the original active area covered by the spots, if other portions of the active area not covered by a spot nevertheless would normally cooperate with the covered area in the production of retroreflected light. An extreme example of this is where nearly all of one entire face of the cube corner element is altered by a triangular-shaped spot. In such case the other two faces, even if left unaltered, will stop retroreflecting and become inactive since they cannot cooperate with the altered face to produce retroreflected light.

Where maximum whiteness is not required or desired, some or all of the spots discussed herein can have a reflective characteristic other than diffusely reflecting and still produce a discernable pattern. All that is required is that the region of the spot have a reflective characteristic which is different from that of neighboring regions on the structured surface. For example, a spot can be an absorbing paint or other substance applied selectively to the article such that specular reflectance at the spot is reduced.

FIGS. 9A–C show an intersection point 20 for the illumination conditions of FIGS. 8A–C respectively. A spot 50 is decentered within inactive area 16, located at its upper boundary. Since there is no overlap between active area 18 and spot 50, there will be no reduction in retroreflectance for normally incident light, as was the case for spot 48. However, with all other factors being equal, spot 50 will give a smaller improvement in whiteness because it has a smaller area than spot 48. The shape and placement of spot 50 is such that it remains completely within the inactive area for off-axis illumination direction 36 (FIG. 9B). For the opposite illumination direction 42, however, (see FIG. 9C) it substantially overlaps active area 30 at portion 30b as shown. In retroreflected light, spot 50 is substantially invisible for incident light directions ranging from direction 36 to normal incidence, and then becomes noticeable for light directions between normal incidence and direction 42. An image composed of a plurality of spots 50 will be viewable in retroreflected light in an observation cone which is asymmetric with respect to the perpendicular axis 40.

FIGS. 10A–C show the same sequence of illumination geometry as FIGS. 9A–C. Spot 52 is sized and positioned so as not to overlap with active areas in each of the geometries shown, and therefore will not be noticeable in retroreflected light at any of these illumination geometries. Spot 54 overlaps partially at portion 18a for normal incidence, has no overlap in FIG. 10B, and overlaps completely at portion 30c of active area 30 in FIG. 10C. Within the range of angles shown, spot 52 only contributes to whiteness with no reduction in retroreflectance. Spot 54 contributes to whiteness and selectively reduces retroreflectance as a function of illumination orientation.

Figure 11A:
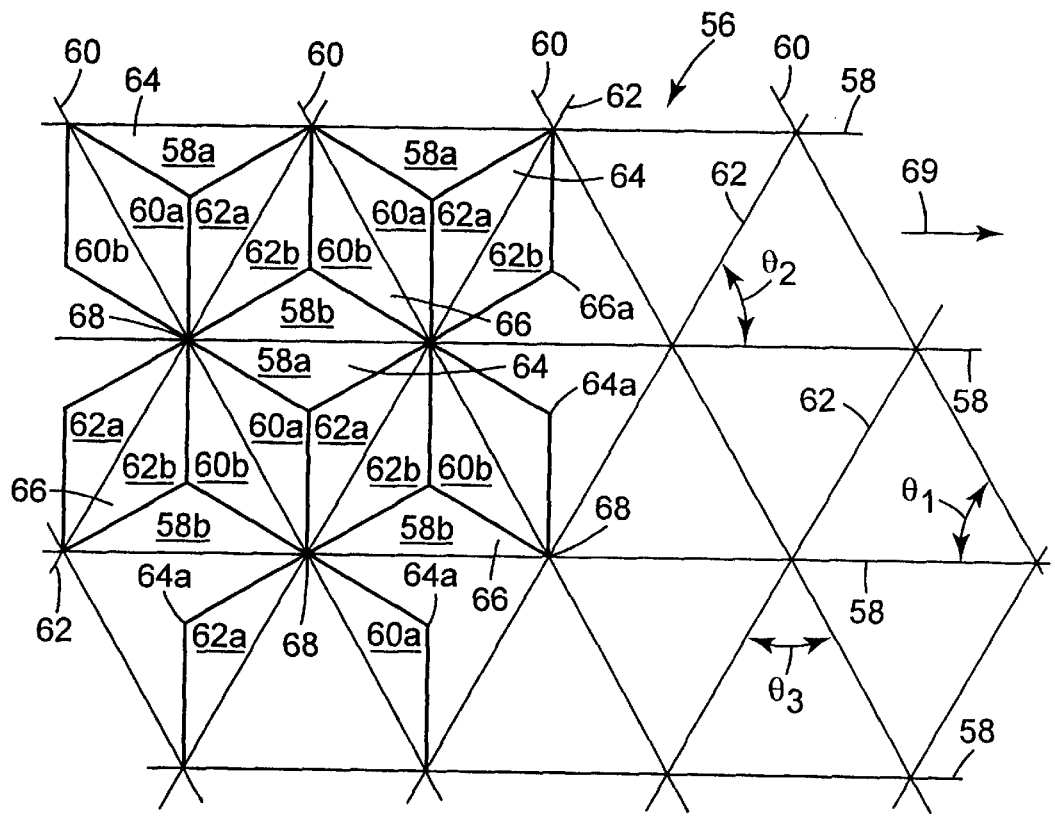
FIG. 11A is a plan view of a retroreflective article similar to that of FIG. 1 except where the cube corner elements are canted.

FIG. 11A shows a front magnified view of a retroreflective sheeting having a structured rear surface 56 comprising parallel groove sets 58,60,62. The groove sets intersect each other as shown at included angles $\theta_1$=55 degrees, $\theta_2$=55 degrees, $\theta_3$=70 degrees. The groove spacing and side angles are as specified in U.S. Pat. No. 4,588,258 (Hoopman) to produce geometrical structures which are canted cube corner elements 64,66. As in FIG. 1, it is understood that groove side surfaces 58a,58b,60a,60b,62a,62b extend indefinitely along the respective grooves. The grooves intersect at intersection points 68. The faces of the cube corner elements converge to cube peaks 64a,66a. Datum mark 69, parallel to groove set 58, is shown for reference purposes.

Figure 11B:
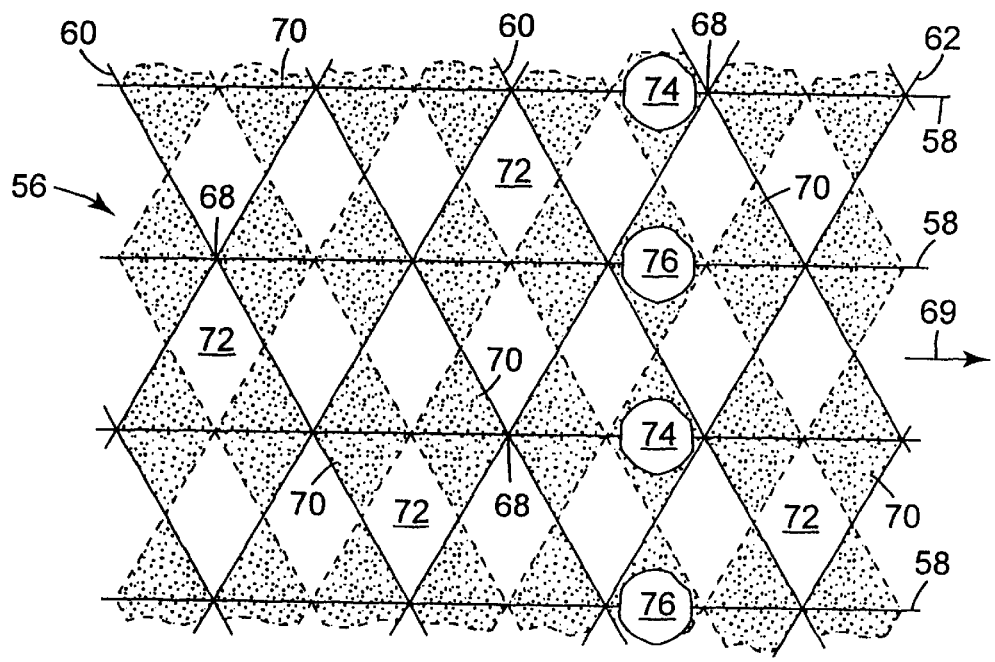
FIGS. 11B–C are plan views depicting active and inactive areas of the article of FIG. 11A at different illumination conditions.

FIG. 11B shows the approximate location of inactive areas 70, shown shaded, and active areas 72, shown unshaded, on the structured surface 56 for normally incident light (β=0). Spots 74 and 76, dispersed among the cube corner elements and located between cube peaks 64a,66a, are provided on the structured surface. Spots 74,76 are sized to occupy a major portion of an inactive area region 70 for increased whiteness. Light retroreflected from normal incidence is not diminished due to spots 74,76.

Figure 11C:
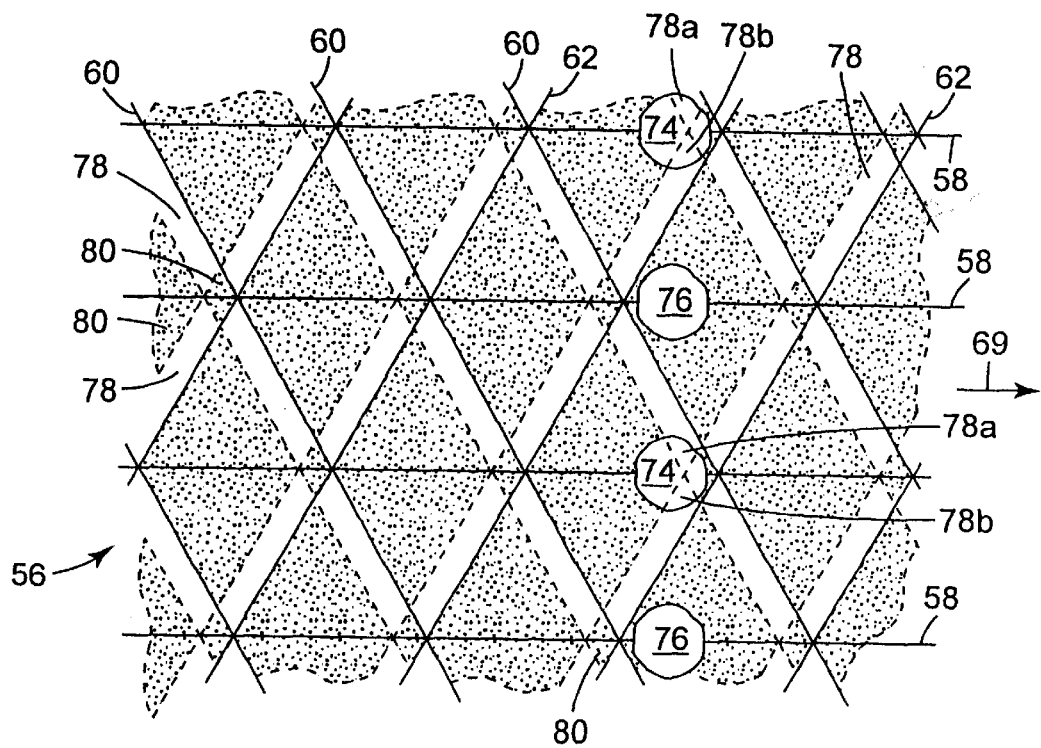

FIG. 11C shows shifted active areas 78 and inactive areas 80 for light incident from the right and tilted 30 degrees from the normal (β=30 degrees, ω=0 degrees from datum mark 69). Spots 76 are seen to remain within inactive areas. Spots 74 are seen to overlap with active areas at two locations 78a,78b. For light incident at the same tilt angle from the left (β=30, ω=180 degrees), it will be apparent that spots 74 will be totally within inactive areas and spots 76 will overlap active areas in two locations similar to locations 78a,78b. Two independent directional patterns or images can be formed by including a set of spots 74 distributed across the face of the article as pixels defining a first pattern and including a separate set of spots 76 independently distributed to define the second pattern. The first pattern will be visible in one off-axis observation cone and the second at a second off-axis observation cone on the opposite side of the normal. Such patterns will not be visible in retroreflected light at normal incidence and all of the individual spots will contribute to the whiteness of the article.

Figure 12:
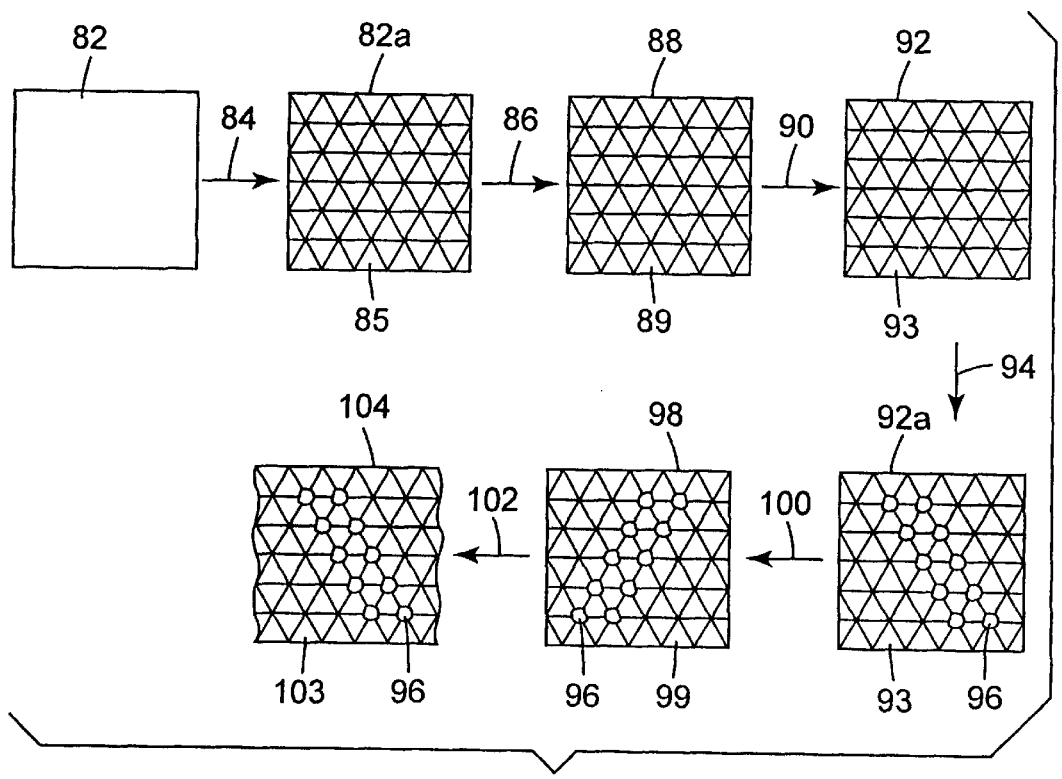
FIG. 12 depicts a sequence starting with an uncut master mold substrate, which includes marking or altering a mother mold in selected inactive areas, and ending with a marked retroreflective sheeting.

Turning now to FIG. 12, a method of fabricating a cube corner article marked with a plurality of diffuse spots is shown. A machinable substrate 82 made of copper, brass, or other suitable material that resists burring is ruled or fly-cut along parallel sets of grooves at step 84 to produce a master mold 82a with a structured surface 85. Cube corner elements on structured surface 85 have apexes which point out of (away from) the structured surface. The master mold is then replicated at step 86 using known replication techniques to produce a nickel "stamper" 88. Stamper 88 has a structured surface 89 which is the inverse or complement of surface 85. Cube corner elements on structured surface 85 have apexes which point into surface 85, making stamper 88 itself retroreflective for light impinging directly on its structured surface 85.

At step 90, stamper 88 is replicated using known replication techniques such as electroforming to produce a nickel "mother" mold 92. Mother mold 92 has a structured surface 93 which is a negative copy of structured surface 89 and a positive copy of surface 85. Cube corner elements on surface 93 thus have apexes which point out of surface 93, and surface 93 is not generally retroreflective to light incident upon it from above. At step 94, selected areas of surface 93—predominantly those areas associated with inactive areas on an article produced from the mold 92, at a given illumination orientation—are irradiated with high peak power pulsed laser light to produce modified mother mold 92a with roughened or textured spots 96. Where the surface to be altered is a structured surface and highly reflective at the laser wavelength, it is advantageous to irradiate the surface in a way which is non-retroreflecting, such as by illuminating surface 85 of master mold 84 or surface 93 of mother mold 92 from above, to avoid sending high energy laser light back to the laser.

A second stamper mold 98 is produced at step 100 by electroforming a negative copy of mother mold 92a. The structured surface 99 of mold 98 is substantially the same as structured surface 89 of first stamper mold 88, except that surface 99 includes the roughened spots 96 thereon. Surfaces 99 and 89 are retroreflective for light incident from above the respective molds. Thus, both stamper molds 88 and 98 can be considered to be retroreflective cube corner articles. At step 102, a negative copy of the structured surface 99 is produced by conventional microreplication techniques in a rear surface 103 of a transparent sheeting 104. Rear surface 103 is substantially the same as surface 93 of mother mold 92a. Rear surface 103 retroreflects light which impinges on a front surface of sheeting 104, opposite the rear surface 103, but does not generally retroreflect light incident from the back side of sheeting 103. The spots 96 are shaped and located such that they overlap with inactive areas more than they overlap with active areas, as described above. Preferably the spots 96 are confined to inactive areas for normally incident light. Also, spots 96 can be provided at each inactive area and each spot 96 can be as large as possible within the bounds of the respective inactive area to have maximum impact on whiteness.

It may be desirable in some instances to eliminate two replicating steps by forming spots 96 directly on the master mold 82a rather than on the mother mold 92. The altered master mold can then be used to form an altered stamper mold, which in turn can be used to produce sheeting. Since each replication step can potentially introduce imperfections or distortions, however slight, into the structured surface, reducing the number of replication steps between the master mold and the sheeting in this way has the benefit of ensuring a finished product with the fewest imperfections. However, disadvantages of this approach include having to machine a new master mold if an error in the marking process occurs, and being unable to produce different finished products having the same cube corner geometry but different spot patterns from the same master mold 85. In contrast, in the process shown in FIG. 12, multiple mother molds 92 can be made from a single master mold 82a, and each mother mold 92 can be altered in a different way (or not altered at all) to produce different finished products from the same master mold 82a.

Figure 13:
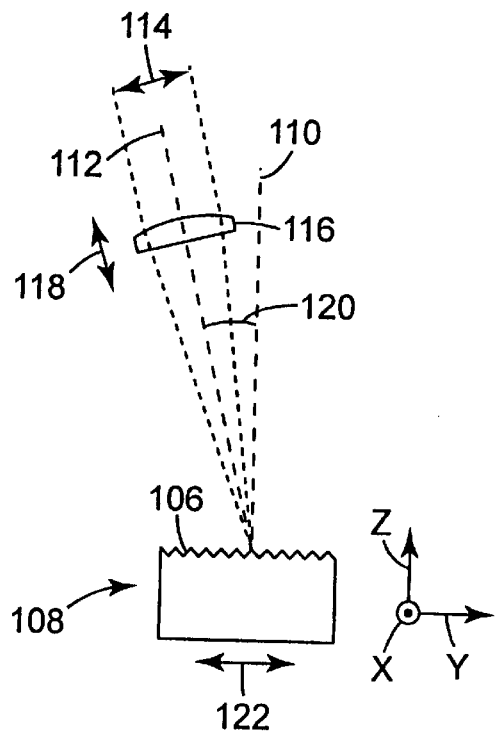
FIG. 13 is an elevational view of an arrangement useable in a process of altering selected areas of a mold or other structured surface.

FIG. 13 shows one setup for altering selected areas of a structured surface 106 of an article 108. The structured surface 106 is oriented generally parallel to an x-y plane in Cartesian coordinates x,y,z. A normal axis 110 is parallel to the z-axis. Cube corner elements on structured surface 106 preferably have apexes directed out of structured surface 106 so that light directed downward onto surface 106 is not retroreflected by such elements. Article 108 can be a master mold (e.g. mold 82a of FIG. 12), a mother mold (e.g. mold 92 of FIG. 12), or even a retroreflective sheeting (e.g. sheeting 104 of FIG. 12). A substantially collimated light beam from a directional source such as a laser is directed along an axis 112. The beam has an initial beam diameter 114 and is focused by lens 116 to a spot on the surface 106. The spot size can be changed by moving lens 116 forward or back along arrow 118. It is desirable that lens 116 have a relatively long focal length so that the depth-of-focus is about the same as the variation in height of surface 106 within areas to be altered. Depending upon details of the structured surface 106, it may also be desirable to tilt axis 112 relative to normal axis 110 by an angle 120 to further avoid reflecting laser light back upon itself.

Article 108 rests on a translation stage capable of precise movement in the x-y plane shown by arrow 122. By proper coordination of stepwise repetitive translation of article 108 and regulation of the light source, an array of spots is formed on surface 106, each spot characterized by a localized surface texture which is roughened or otherwise altered compared to neighboring surfaces of structured surface 106. The roughened texture of the spot on article 108 and/or on replicas thereof reflects light diffusely compared to the neighboring surfaces.

Figure 14:
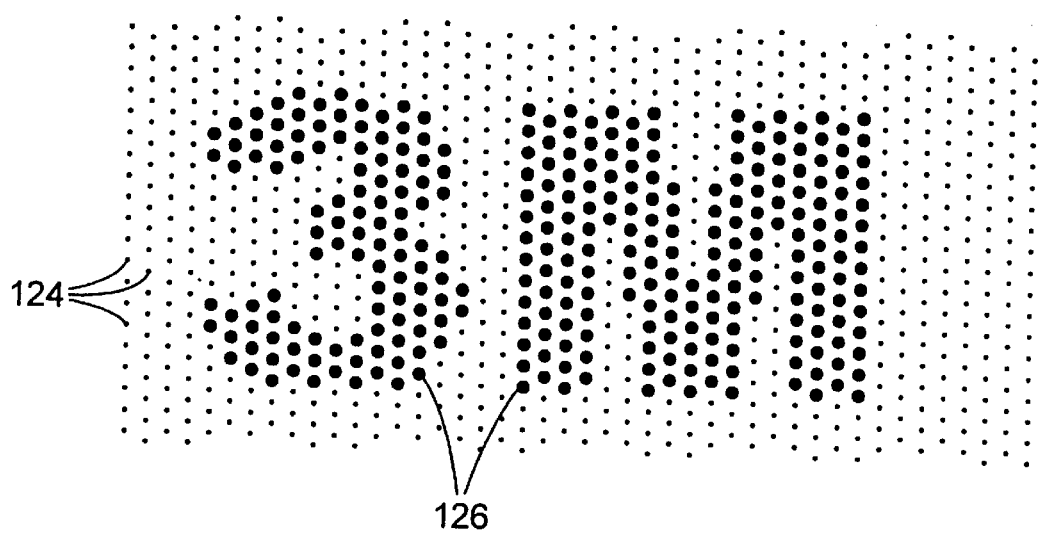
FIG. 14 is a plan view of diffusely reflective spots arranged to form a macroscopic pattern.

In FIG. 14, points 124 represent positions of inactive areas on a cube corner retroreflective sheeting. Diffusely reflective spots 126 have been applied selectively to some of the points 124 to form a macroscopic pattern "3M" as shown. Arranging spots 126 in a pattern such as this to identify the manufacturer of the sheeting advantageously deters competitors from duplicating the sheeting and selling it as their own. Spots 126 can also be arranged to provide other information such as a product model number, date of manufacture, and, for canted or otherwise orientationally sensitive cube corner elements, sheeting orientation information (e.g., "This Side Up→" or "←Vertical→"). As discussed above, sheeting used for graphics applications can incorporate oversized spots 126 at every inactive area for enhanced whiteness, or spots 126 arranged in a half-tone image. If the number of inactive areas outside the desired image areas are greater than the number of inactive areas inside the desired image areas, whiteness can be enhanced by producing a negative image, whereby all inactive areas outside the desired image area are marked with the diffusely reflective spots and inactive areas inside the desired image area are left unaltered.

Figure 15:
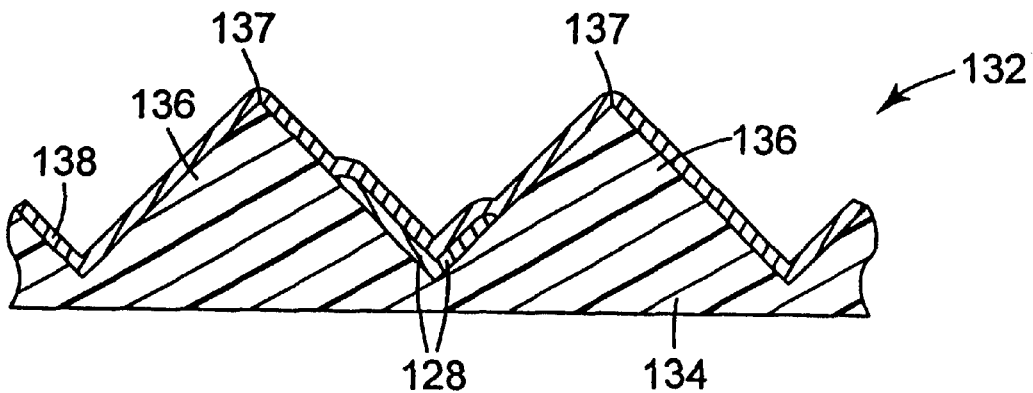
FIGS. 15 and 16 are sectional views of canted cube corner sheeting having different spots applied thereto.
Figure 16:
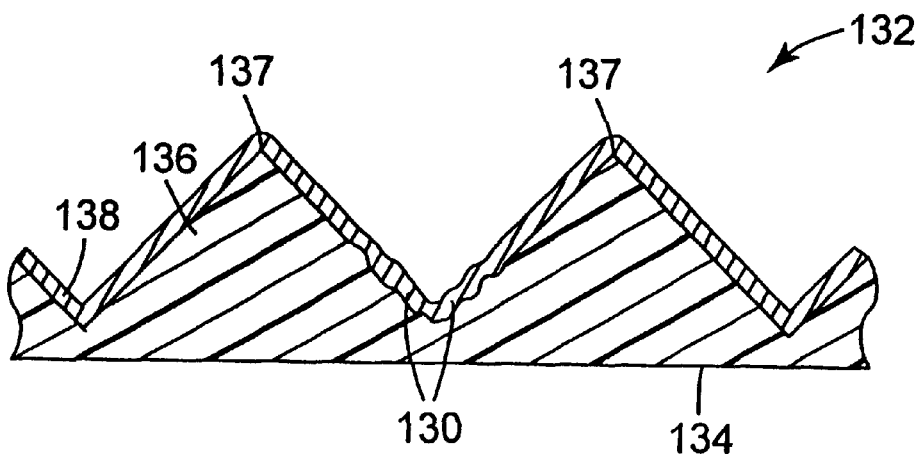

FIGS. 15 and 16 show sectional views of two different types of spots 128,130 positioned predominantly within inactive areas of canted cube corner sheeting 132 similar to that disclosed in U.S. Pat. No. 4,588,258 (Hoopman). Sheeting 132 has a front surface 134 opposite a structured surface which includes cube corner elements 136. The faces of elements 136 converge at cube peaks 137. Sheeting 132 also has an optional specularly reflecting vapor coat 138 of aluminum or other suitable metal applied uniformly to the structured surface. Spot 128 comprises a layer of photoresist which was initially applied uniformly on the structured surface prior to vapor coat 138 and then removed using standard photolithographic techniques in all areas except for at spot 128. Spot 130 comprises locally roughened surfaces of cube corner elements 136, formed for example by localized heating from a focused laser light source.

The term "sheeting" generally refers to articles which have a thickness on the order of about 1 mm or less and which in large samples can be wound tightly into a roll for ease of transportation. Retroreflective sheeting can be manufactured as an integral material, e.g. by embossing a preformed sheet with an array of cube corner elements or by casting a fluid material into a mold. Alternatively, retroreflective sheeting can be manufactured as a layered product by casting the cube corner elements against a preformed film or by laminating a preformed film to preformed cube corner elements. The cube corner elements can be formed on a polycarbonate film approximately 0.5 mm thick having an index of refraction of about 1.59. Useful materials for making retroreflective sheeting are preferably materials that are dimensionally stable, durable, weatherable, and readily formable into the desired configuration. Generally any optically transmissive material that is formable, typically under heat and pressure, can be used. The sheeting can also include colorants, dyes, UV absorbers or separate UV absorbing layers, and other additives as needed. As discussed earlier, a backing layer sealing the cube corner elements from contaminants can also be used, together with an adhesive layer.

EXAMPLE 1

Four individual cube corner prisms made of glass, each having triangular base entrance faces 1.5 inches (38 mm) on a side, were obtained. The base entrance face and the three mutually perpendicular side faces for each prism had smooth polished surface finishes. The inactive areas for normal incidence (hereinafter, the "$\beta=0$ inactive areas") of the prisms were identified. For two of the prisms, portions of the side faces near the three corners of the base, corresponding to the $\beta=0$ inactive areas, were chemically etched to produce a frosted surface finish. One of these etched prisms and one of the unetched prisms were aluminum coated on all faces except the base entrance face. Each of the prisms was then illuminated with substantially collimated light incident on the base entrance face at $\beta=45$ degrees, and the luminance of light reflected from the respective prism in a direction normal to the base entrance face was measured with a photometer. For reference purposes, a glossy black standard and a barium sulfate white standard were also measured. The whiteness of the various articles for the illumination geometry is assumed to be proportional to the measured luminance of reflected light. A comparison of the results for prisms A and B, and for prisms C and D, in the table below demonstrate the effect on reflected light, and hence on whiteness, of the diffusely reflecting spots covering the inactive areas.

|  | Prism "A" | Prism "B" | Prism "C" | Prism "D" | Black Std | White Std |
| --- | --- | --- | --- | --- | --- | --- |
| Inactive areas etched | No | Yes | No | Yes | (N/A) | (N/A) |
| Alum. Coated | No | No | Yes | Yes | (N/A) | (N/A) |
| Luminance (cd/m$^2$) | 4 | 8 | 5 | 11 | 2 | 50 |

EXAMPLE 2

A nickel mother mold having noncanted (60-60-60 degree base triangle) cube corner elements therein was obtained and placed in the setup of FIG. 13. Light from a pulsed Q-switched Nd:YAG laser ($\lambda=1.06$ $\mu$m) was expanded to a beam width 114 of about 32 mm and focused onto the structured surface of the mold by a plano-convex lens 116 having a focal length of 500 mm. The tilt angle 120 was about 5 degrees. It was found that positioning lens 116 slightly closer to the structured surface than the position which produces minimum spot size, and keeping the pulse energy of the laser at no more than about 2 millijoules/pulse resulted in a spot surface texture having good light diffusing properties. Each spot was formed using one 2 millijoule energy pulse centered on a given groove intersection point. These conditions were also found to avoid doing damage to areas on the structured surface adjacent the desired spot location. The spots were approximately round with diameters of about 0.16 to 0.20 mm. The spots were distributed uniformly on the structured surface of the mother mold (at each of the groove intersections) in a zone measuring about 25 by 27 mm.

A stamper (a negative copy of the altered nickel mother mold) was made in nickel from the marked mother mold.

When viewing the stamper in retroreflected light, no darkening of the altered zone relative to neighboring unaltered areas was visible to the eye for β<20 degrees. Some darkening was visible for various values of β>20 degrees and various values of ω. When the stamper was illuminated with diffuse, nondirectional light, the altered zone appeared whiter than its surroundings at only certain viewing angles; at other angles it appeared the same as its surroundings. When the stamper was illuminated with directional light (sunlight), the altered zone appeared whiter than its surroundings at most viewing angles.

A "pressing" (a relatively thin generally flat article having a structured rear surface which is a negative copy of the stamper) composed of a transparent polymer believed to be polycarbonate was then made from the stamper. The cap-Y whiteness of the pressing was measured using standard illuminant D65 (simulated daylight) and the 2-degree standard observer, both as described in A.S.T.M. Standard No. E308. Measurements were made of the altered 25 by 27 mm zone containing the spots, and compared to measurements for areas of the pressing outside the zone. On average, the altered zone yielded a cap-Y whiteness of 17.33 compared to 15.88 in the other areas, demonstrating an average whiteness increase of 1.45 units.

EXAMPLE 3

A sample comprising a single acrylic layer having a structured rear surface of non-canted cube corner elements with an aluminum vapor coat was obtained. The pulsed Q-switched laser mentioned above was focused to a relatively large area about 3 mm in diameter, encompassing a large number of cube corner elements, and directed through the front of the sample. A Faraday isolator protected the laser from backscattered high energy light. The reflections caused by the structured surface and the sufficiently high peak power laser light cooperated to remove the vapor coat from portions of the structured surface.

When the altered sheeting was observed under diffuse illumination, little effect was visible. When viewed in retroreflected light, patterns formed from a multitude of spots were visible within limited angular ranges as dark areas.

Glossary of Certain Terms

Datum Mark: a mark (whether real or hypothetical) on a reflective article that is used as a reference to indicate orientation about the reference axis.

Entrance Angle (β): the angle between the illumination axis and the reference axis.

Entrance Half-Plane: a half-plane which originates on the reference axis and contains the illumination axis.

Groove Side Angle: the dihedral angle between a groove side and a plane extending parallel to the length of the groove and perpendicular to a base surface of the reflective article.

Illumination Axis: a line segment extending between the reference center and the source of illumination.

Light: electromagnetic radiation, whether in the visible, ultraviolet, or infrared portion of the spectrum.

Orientation Angle (ω): the dihedral angle between the entrance half-plane and a half-plane originating on the reference axis and containing the datum mark.

Reference Axis: a line segment extending from the reference center away from the reflective article, and which is ordinarily perpendicular to the reflective article at the reference center.

Reference Center: a point on or near a reflective article which is designated to be the center of the article for specifying its performance.

Visible Light: light detectable by the unaided human eye, generally in the wavelength range of about 400 to 700 nm.

All U.S. patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A reflective article having a structured surface including a plurality of geometric structures each having at least three specularly reflecting faces which converge at an extremity of the respective geometric structure, the geometric structures having first active areas associated therewith at a first illumination geometry, the article also having a plurality of spots having different reflectance characteristics than the three specularly reflecting faces, the spots being disposed on the structured surface at positions spaced apart from each extremity sufficiently to substantially avoid the first active areas.

2. The article of claim 1, wherein the spots are diffusely reflecting.

3. The article of claim 1, wherein the spots are diffusely reflecting and distributed in a uniform array on the structured surface.

4. The article of claim 1, wherein the plurality of spots are distributed to define a macroscopic pattern.

5. The article of claim 4, wherein the macroscopic pattern indicates the manufacturer of the article.

6. The article of claim 4, wherein the spots are selectively disposed within zones comprising the macroscopic pattern.

7. The article of claim 1, wherein at least some of the spots comprise areas of the structured surface having a localized surface roughness.

8. The article of claim 1, wherein at least some of the spots comprise areas having a diffusing substance selectively applied to the structured surface.

9. The article of claim 1, wherein the geometric structures comprise cube corner elements.

10. The article of claim 1, wherein the article has a plurality of first inactive areas adjacent the first active areas, and wherein each spot is substantially confined to one of the first inactive areas.

11. The article of claim 10, wherein each spot covers most of the corresponding first inactive area.

12. The article of claim 1, wherein the article has a plurality of second active areas at a second illumination geometry, and wherein at least some of the spots are disposed to at least partially overlap the second active areas.

13. The article of claim 1, wherein the article comprises a mold suitable for forming retroreflective sheeting.

14. The article of claim 1, wherein the article comprises retroreflective sheeting.

15. The article of claim 14, further comprising a layer of specularly reflective material applied to the structured surface.

16. The article of claim 15, wherein the specularly reflective material comprises aluminum.

17. A cube corner article having a structured surface including a plurality of cube corner elements having specularly reflecting faces, the article also having a plurality of spots dispersed among the cube corner elements, the spots having different reflectance characteristics than the specularly reflecting faces and positioned at locations on the structured surface that do not substantially degrade retroreflective performance of the cube corner elements at least at a first illumination geometry.

18. The article of claim 17, wherein the spots are diffusely reflecting.

19. The article of claim 17, wherein each cube corner element has associated therewith a first active area at the first illumination geometry, and the spots are arranged to substantially avoid the first active areas.

20. The article of claim 19, wherein each cube corner element further has associated therewith a second active area at a second illumination geometry, and at least some of the spots are arranged to at least partially overlap the second active areas.

21. The article of claim 20, wherein the second illumination geometry corresponds to an entrance angle greater than about 20 degrees.

22. A method of making a cube corner article, comprising:
providing an article having a structured surface, the structured surface comprising a plurality of elements each having three approximately mutually perpendicular faces which converge at an extremity of the element; and
selectively altering the structured surface at spots spaced apart from the extremities.

23. The method of claim 22, wherein the selectively altering step comprises selectively roughening the structured surface.

24. The method of claim 23, wherein the selectively roughening step is accomplished by irradiating the structured surface with light.

25. The method of claim 24, wherein the article comprises a mold suitable for forming cube corner sheeting.

26. The method of claim 22, wherein the selectively altering step comprises selectively applying a diffusing substance to the structured surface.

27. The method of claim 22, wherein the selectively altering step comprises selectively applying an absorbing substance to the structured surface.

28. The method of claim 22, wherein the structured surface has associated therewith a plurality of first active areas and first inactive areas associated with a first illumination geometry, and wherein the selectively altering step comprises forming the spots in a centered fashion within the first inactive areas.

29. The method of claim 22, wherein the structured surface has associated therewith a plurality of first active areas and first inactive areas associated with a first illumination geometry, and wherein the selectively altering step comprises forming the spots in a decentered fashion within the first inactive areas.

30. A method of making a marked cube corner article, comprising:
providing an article having a structured surface, the structured surface having a plurality of first active areas and first inactive areas associated with a first illumination geometry; and
marking the structured surface selectively in the first inactive areas.

31. The method of claim 30, wherein the article comprises a mold suitable for forming cube corner sheeting.

32. The method of claim 30, wherein the marking step comprises roughening the structured surface selectively in the first inactive areas.

* * * * *

UNITED STATES PATENT AND TRADEMARK OFFICE
CERTIFICATE OF CORRECTION

PATENT NO. : 5,940,212
DATED : August 17, 1999
INVENTOR(S) : Johnson, Norbert L.

It is certified that error appears in the above-identified patent and that said Letters Patent is hereby corrected as shown below:

<u>Column 5,</u>
Line 28, delete "$\omega \approx 80$" and insert in place thereof -- $\omega \approx 180$ --.

Signed and Sealed this

Nineteenth Day of November, 2002

Attest:

JAMES E. ROGAN
Attesting Officer            Director of the United States Patent and Trademark Office